Sept. 9, 1958  J. FRASER  2,851,057
MIXING TYPE SINK FIXTURE
Filed April 5, 1956  3 Sheets-Sheet 1

INVENTOR.
JAMES FRASER
BY
Holcombe Wetherill & Brisbois
ATTORNEYS

Sept. 9, 1958 　　　　　J. FRASER 　　　　　2,851,057
MIXING TYPE SINK FIXTURE
Filed April 5, 1956 　　　　　　　　　　　　　3 Sheets-Sheet 2
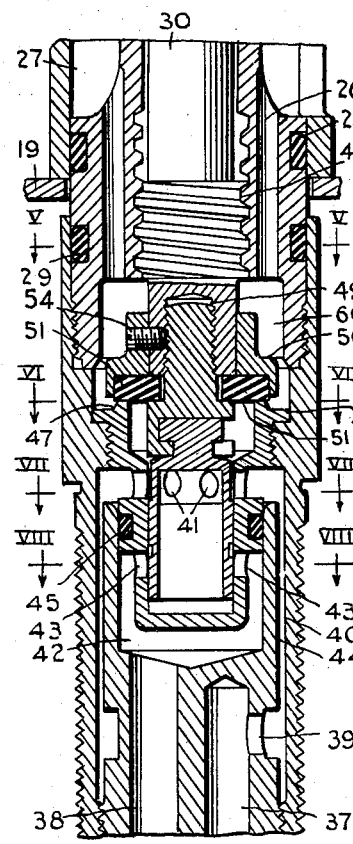
Fig. 2.
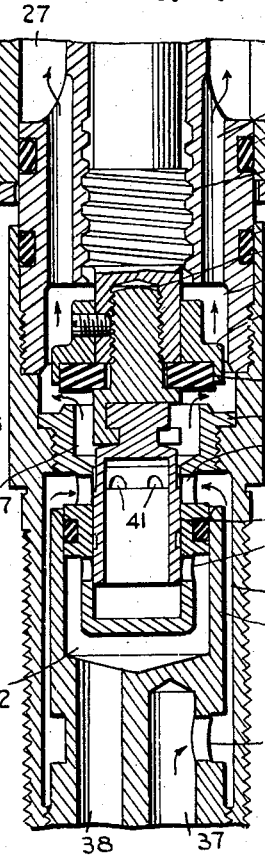
Fig. 3.
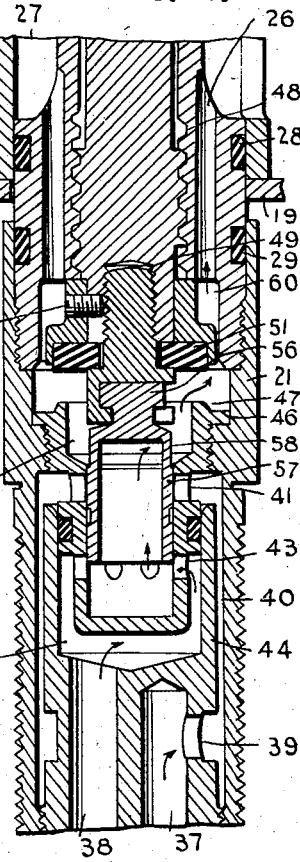
Fig. 4.
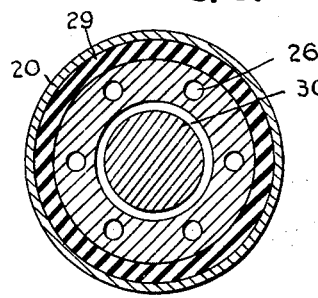
Fig. 5.
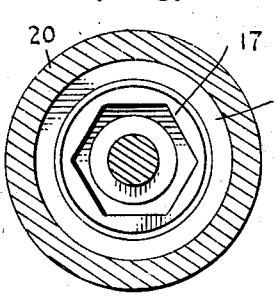
Fig. 6.
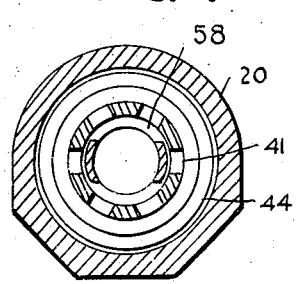
Fig. 7.
Fig. 8.
INVENTOR.
JAMES FRASER
BY
Holcombe, Wetherill & Brisebois
ATTORNEYS Sept. 9, 1958  J. FRASER  2,851,057
MIXING TYPE SINK FIXTURE
Filed April 5, 1956  3 Sheets-Sheet 3
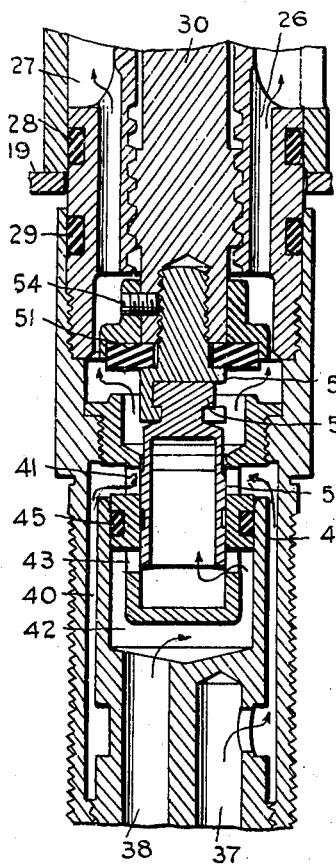
Fig. 9.
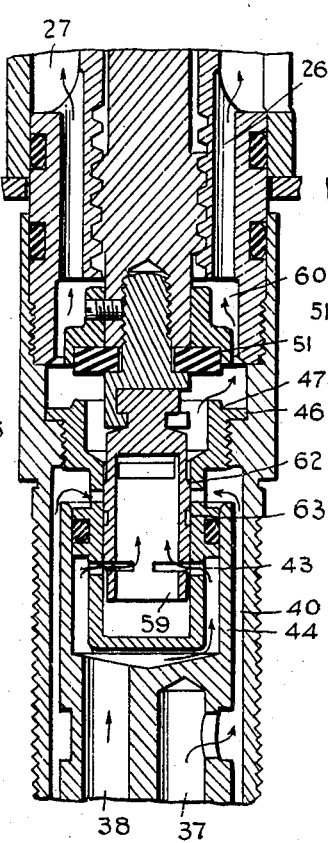
Fig. 10.
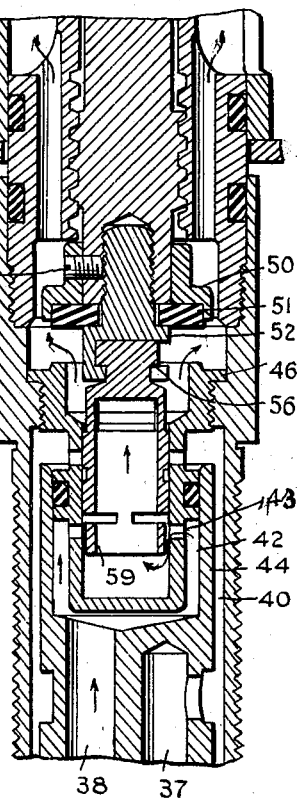
Fig. 11.
Fig. 12.
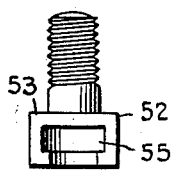
Fig. 14.
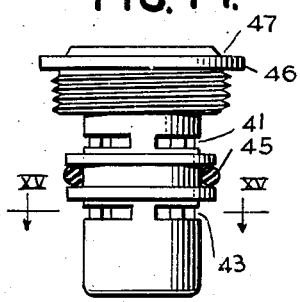
Fig. 16.
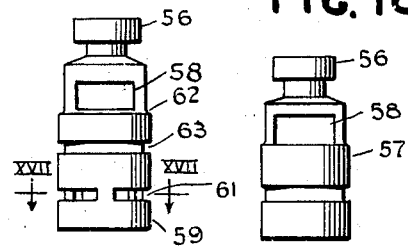
Fig. 18.
Fig. 13.
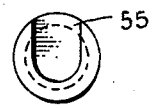
Fig. 15.
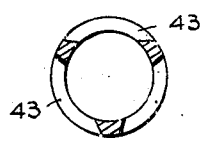
Fig. 17.
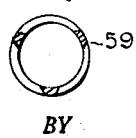
INVENTOR.
JAMES FRASER
BY
Holcombe, Wetherill & Ruebsam
ATTORNEYS

United States Patent Office 2,851,057
Patented Sept. 9, 1958

2,851,057

MIXING TYPE SINK FIXTURE

James Fraser, Wilmington, Del., assignor to Speakman Company

Application April 5, 1956, Serial No. 576,269

2 Claims. (Cl. 137—630.17)

This invention relates to the type of mixing valves that are to be used for the purpose of regulating the temperature of a liquid by proportioning the flow of the liquid from two different sources of supply.

Heretofore mixing valves for admixing hot and cold water have been bulky heavy valves, difficult to install because they do not fit within the standard openings in kitchen and pantry sinks.

It is an object of this invention to produce a mixing valve of such diameter that it will fit within the opening in standard plumbing fixtures of this type.

It is also an object of this invention to produce a valve that will give an admixture of hot and cold water in any desired proportion.

It is a still further object of this invention to produce a valve that will admit mixtures of hot and cold water in any desired proportion and in the extreme position will admit hot water only under reduced pressure.

Various features of novelty which characterize this invention are pointed out with particularity in the claims annexed to and forming part of this specification.

For a better understanding of the invention, its advantages and specific objects obtained with its use, reference should be had to the accompanying drawings and descriptive matter in which has been illustrated and described the preferred embodiment of the invention.

In the drawings:

Fig. 2 is a profile view in section, showing the valve in the closed position.

Fig. 3 is a profile view in section showing the valve admitting cold water only.

Fig. 4 is a profile view in section showing the valve admitting hot water only.

Fig. 5 is a sectional view on line V—V of Fig. 2.

Fig. 6 is a sectional view on line VI—VI of Fig. 2.

Fig. 7 is a sectional view on line VII—VII of Fig. 2.

Fig. 8 is a sectional view on line VIII—VIII of Fig. 2.

Fig. 9 is a profile view in section, showing the valve admitting both hot and cold water.

Fig. 10 is a profile view in section, showing the valve with a plunger having a skirt appended thereto admitting hot water under full pressure.

Fig. 11 is similar to Fig. 10 and shows the valve delivering hot water at reduced volume.

Fig. 12 is a side view of the threaded plunger catch.

Fig. 13 is a bottom view of the threaded plunger catch.

Fig. 14 is a side view of the removable mixing chamber.

Fig. 15 is a sectional view on line XV—XV of Fig. 14.

Fig. 16 is a side view of the plunger with a skirt appended thereto.

Fig. 17 is a sectional view on line XVII—XVII of Fig. 16.

Fig. 18 is a side view of the plunger without the skirt attached thereto.

Figure 1:
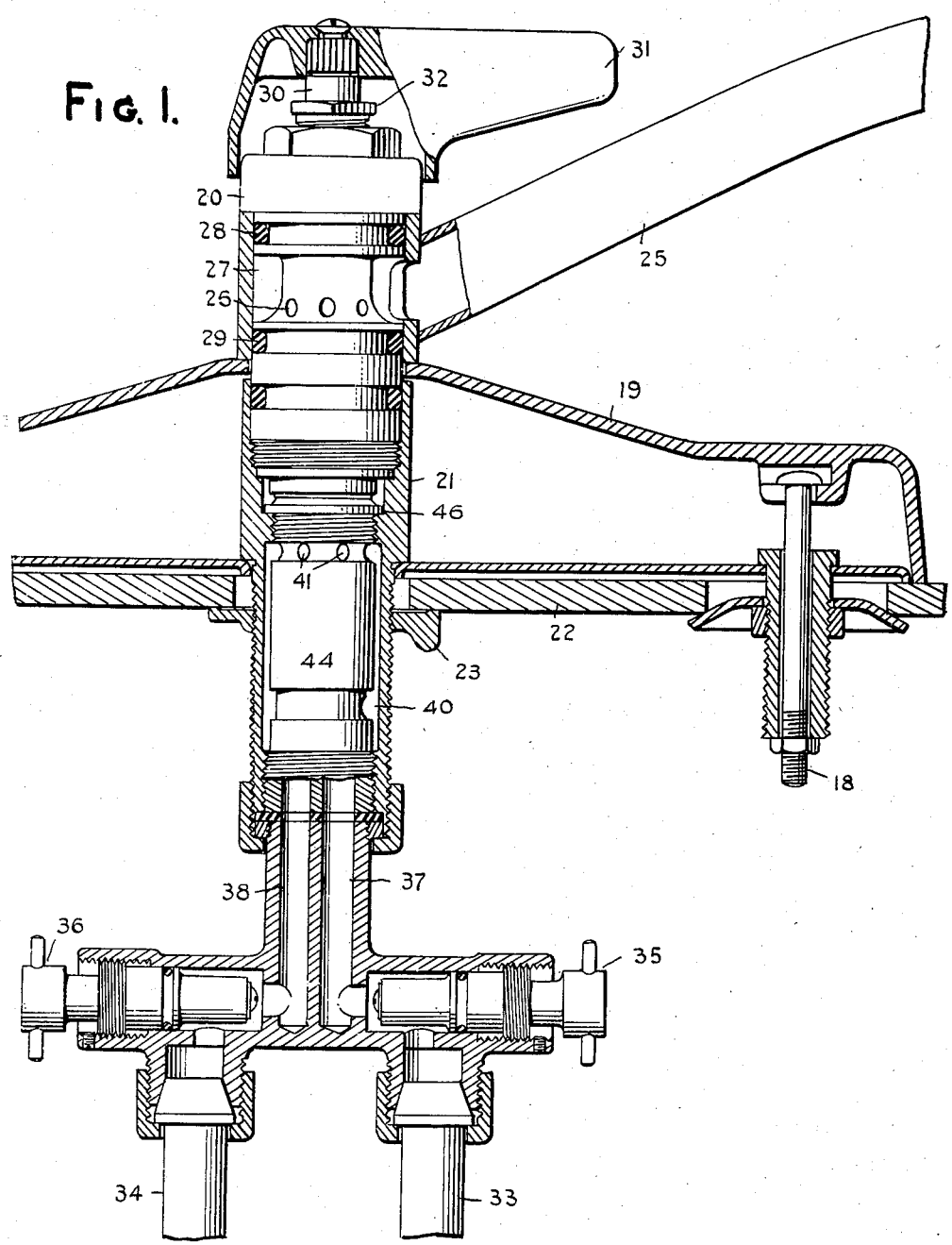
Figure 1 is a front elevational view of a mixing valve embodying the present invention.

In its form shown in Figure 1, the novel mixing deck sink valve 20 comprises a brass housing 21, secured to the kitchen sink shelf 22 of the plumbing fixture by means of the nut 23. This holds in position the fixture 19 which is supported on each end thereof by the bolts 18, only one of which is shown. Attached to the upper part of the brass housing 21 is the swinging nozzle 25, which connects to the outlet port 26, by means of the outlet chamber 27. The chamber 27 is held in water tight relation by means of the O-rings 28 and 29. The spindle 30 has attached thereto a handle 31 for rotation thereof, and is maintained in water-tight relationship with the rest of the valve by means of the packing gland (not shown), and the packing nut 32 on the top thereof. The cold water inlet 33 and the hot water inlet 34 are shown at the bottom of Fig. 1. Each of these inlets is supplied with shut-off valves having stop spindle 35 and 36, shown in the open position. These spindles are of the usual type and are equipped with O-rings as shown. The cold water inlet 33 connects with the vertical cold water conduit 37 and the hot water inlet connects with the hot water conduit 38. The cold water conduit 37 is opened by means of the port 39, shown in Fig. 2, and allows the cold water to flow upwardly through the passage 40 and into the cold water inlet ports 41, 41, shown in Figs. 1 and 2. The hot water conduit 38 admits the hot water to the hot water passage 42 shown in Fig. 2, which admits the hot water to the hot water inlets 43, 43, shown in Fig. 2. The cold water passage 40 and the hot water passage 42 are seperated by the wall 44. A mixing chamber 46 (shown in Fig. 14) is screw-fastened into the outer wall of the valve body, as shown in Fig. 2, and separates the hot and cold water passages by contacting the wall 44 by means of an O-ring 45 set in a groove on the outer circumference of the mixing chamber 46. This mixing chamber is shown in detail in Fig. 14 and seats across the opening in the main valve body and forms a water tight connection therewith. This mixing chamber is removable as it has a hexagonal opening 17 in the top thereof, shown in Fig. 6. The upper surface of this mixing chamber has a raised valve seat 47 thereon, shown in Figs. 6 and 14. The mixing chamber also has the cold water inlet 41 near the top thereof, shown in Figs. 7 and 14, and the hot water inlet port 43, shown in Figs. 8 and 14, near the bottom thereof. These ports are in the sides of the mixing chamber as shown by the sectional view in Figs. 8 and 15.

The valve spindle 30 has a threaded portion 48 thereof which engages a threaded portion of the valve housing shown in Fig. 2. The bottom portion of the spindle 30 has a screw-threaded recess 49 therein and has a flange 50 on the outer end thereof. This flange receives a washer 51 which contacts the valve seat 47 on the mixing chamber and forms a shut-off valve. Within the screw-threaded recess 49 is inserted the screw-threaded plunger catch 52, shown in Fig. 12. The upper shoulders 53 of the plunger catch retain the washer 51 in position, as shown in Fig. 2, and are held in place by means of the set screw 54. This plunger catch has an opening slot 55 (shown in Fig. 13) in the bottom thereof to receive the head portion 56 of the plunger 57, shown in Figs. 16 and 18. This plunger is finished to exactly fit the interior of the mixing chamber and has openings 58, 58 across each side of the top thereof, connecting with the hollow center and an opening in the bottom of the plunger, shown in Figs. 2 and 18. This plunger or valve member has a central portion of reduced diameter, as shown, with a bearing portion on each side thereof and reciprocates within the mixing chamber to admit water from either the cold water or hot water inlet ports or from both, depending upon position within the mixing chamber, which position is regulated by rotating the spindles 30 which reciprocate due to the thread 48 on the circumference thereof.

A second modification of this invention is shown in Fig. 16, wherein the plunger is similar to that shown in Fig. 18, except that it has a skirt 59 extending on the bottom thereof. This skirt has water ports 61 accurately milled in the bottom thereof, at just the correct distance below the cold water shut-off point 62. A groove 63 is cut in the body so as to give two bearing surfaces on each side of this groove and the skirt 59 is ground to a diameter approximately .002 inch less than the plunger body.

In operation the assembled valve in its closed position is shown in Fig. 2. The shut-off valve washer 51 is in contact with the valve seat 47 closing the outlet port to the mixing chamber as shown. When the handle 31 is rotated the valve spindle 30 rises and opens the outlet port (as shown in Fig. 3) from the mixing chamber and allows the cold water flowing through cold water passage 40 to enter through the top of the plunger and through the outlet ports 58 into the outlet passage 60 and through the ports 26, 26, shown in Fig. 5, into the nozzle fixture 25. As the spindle 30 continues to rise the circumference of the plunger 57 closes off the cold water ports 41 and opens the hot water ports 43, as shown in Fig. 4, thereby allowing the hot water to flow in under the plunger up to the center thereof through the top and out the outlet passage 60 through ports 26 to outlet chamber 27 and through the nozzle 25.

In the intermediate position, shown in Fig. 9, which is between that position shown in Figs. 3 and 4, the plunger has partially closed the cold water port and partially opened the hot water port, thereby producing a mixture of hot and cold water, the quantity of each depending on the position of the plunger within the mixing chamber, the water becoming hotter as the plunger rises because the cold water ports are progressively closed and the hot water ports are progressively opened.

When the second modification disclosed in this invention is used and the plunger has the skirt, shown in Fig. 16, described above, it operates as described above until the spindle 30 has risen to the point where the cold water ports are closed and hot water is admitted under full pressure, as shown in Fig. 10, the hot water being admitted through the port 43 and through the slots between the body portion and the skirt 59 of the plunger.

When the spindle continues to rise, the ports on the side of the plunger are closed by the side walls of the mixing chamber and the skirt 59 overlies the hot water ports 43, allowing the hot water to flow around the reduced diameter of the skirt and out the exhaust ports of the mixing chamber under reduced pressure, as shown in Fig. 11. This allows the housewife using this type of fixture in the kitchen sink to open the valve and obtain hot water at a low rate of flow or a greater flow if desired, by moving the handle, for rinsing dishes or other household utensils.

Using the second modification, having the plunger with the attached skirt, it allows the hot water to flow under a reduced volume which is of advantage when it is desired to have the hot water flow through a hose or spray nozzle for rinsing dishes or other household utensils.

The valve mechanism as shown, is arranged so that the over-all diameter will fit easily within the standard opening in plumbing fixtures and does not require that additional or enlarged openings be made in the fixture and therefore requires no special equipment.

Also, a valve having a removable mixing chamber and a plunger to fit therein may be repaired without extensive equipment and with greater ease.

While in accordance with the provisions of the specification the best forms of embodiment of the invention have been illustrated, and described, it will be apparent to those skilled in the art that changes may be made in the form of the apparatus disclosed without departing from the spirit of the invention as set forth in the appended claims, and that in some cases certain features of the invention may be used to advantage without corresponding use of other features and the use of the mixing valve is not restricted to the use as a sink fixture.

What is claimed is:

1. A mixing valve comprising a body having a generally cylindrical bore lengthwise of the body, two longitudinally spaced apart ports communicating with said bore for admitting hot and cold water, said bore having a removable mixing chamber intermediate said ports, said mixing chamber containing upper and lower ports for communication with the longitudinally spaced ports communicating with the bore, said body having an outlet port communicating with said mixing chamber by means of a shut-off valve, a reciprocating valve element within said mixing chamber, open at the bottom to admit water to the hollow central portion thereof and open at the top to allow the water to flow therefrom to said outlet port and having a skirt attached to the bottom end thereof in spaced relation thereto with slots cooperable with the lower inlet ports above the skirt, said skirt being of reduced diameter, said valve element placing the reduced diameter skirt portion in overlying relationship with the lower inlet port in the extreme upper position of said valve element thus causing the water to flow around the reduced skirt portion under reduced pressure, said valve element being mounted on a valve spindle which reciprocates with rotation, said shut-off valve mounted on the spindle above said valve element, a valve seat on the top of the mixing chamber; said valve element allowing the flow of water from the upper port into the mixing chamber when the shut-off valve first opens, thereafter restricting the flow of water from the upper inlet port and opening the lower inlet port as the valve element rises, thereby admitting a mixture of water from the two inlet ports in an intermediate position, closing the upper inlet port, admitting water only from the bottom inlet port when the valve element continues to rise, and means to rotate the spindle and thereby operate the valve.

2. A mixing valve having cold water and hot water inlets to a mixing chamber and a discharge outlet, a shut-off valve located on the top of said mixing chamber between said mixing chamber and said discharge outlet and a seat coextensive with the walls of said chamber for cooperation with said shut-off valve to control the flow of water to said discharge outlet, a valve element within said mixing chamber, said element being hollow and having an opening at the top thereof to allow the water to flow therethrough, a valve spindle to which the valve element is attached, said spindle to reciprocate with rotation, said shut-off valve attached to the spindle above the valve element to close the outlet port when the spindle is in the closed position and to open the outlet port and allow cold water immediately to flow from the cold water inlet past the top of the valve element and to the outlet, as the valve element rises it restricts the cold water inlet and opens the hot water inlet, as it continues to rise further, said valve element having a skirt of reduced diameter attached to the bottom end thereof in spaced relation thereto, the slot cooperable with the lower inlet port above the skirt, said valve element placing the reduced diameter skirt portion in overlying relationship with the lower inlet port in the extreme upper position of said valve element thus causing the water to flow around the reduced skirt portion under reduced pressure.

References Cited in the file of this patent
UNITED STATES PATENTS

| | | |
|---|---|---|
| 925,436 | Kenly | June 15, 1909 |
| 2,747,604 | Fraser | May 29, 1956 |